United States Patent [19]

Ege

[11] 4,048,686
[45] Sept. 20, 1977

[54] BUOYANCY DEVICE AND METHOD

[75] Inventor: Sigmund Ege, Oslo, Norway

[73] Assignee: Kløften & Kløften A/S, Oslo, Norway

[21] Appl. No.: 704,017

[22] Filed: July 9, 1976

[51] Int. Cl.² .............................................. B63B 21/52
[52] U.S. Cl. ..................................... 9/8 R; 114/16 E; 61/112
[58] Field of Search ............. 9/8 R, 8 P, 8.3 R, 8.3 E, 9/9; 114/49, 51, 52, 53, 16 E; 61/105, 107, 108, 109, 112

[56] References Cited

U.S. PATENT DOCUMENTS

| 3,402,687 | 9/1968 | Tsuji | 9/8 R |
| 3,620,028 | 11/1971 | Wilde | 61/112 |
| 3,628,205 | 12/1971 | Starkey | 9/8 R |
| 3,753,311 | 8/1973 | Boone | 9/8 R |
| 3,855,656 | 12/1974 | Blenkarn | 9/8 R |
| 3,961,389 | 6/1976 | Dovell | 9/8 R |

FOREIGN PATENT DOCUMENTS 538,561  8/1941  United Kingdom .................. 114/51

Primary Examiner—Trygve M. Blix
Assistant Examiner—D. W. Keen
Attorney, Agent, or Firm—Victor F. Volk

[57] ABSTRACT

Buoys for use in submarine cable and pipe laying are fastened to the cable or pipe by lengths of line stored within the buoys. The buoys descend with the cable to a point where they are unaffected by wave action. Water is free to enter the bottom of the buoys and compress the gas therein thus reducing buoyancy and, through the release of a brake, controlled, in turn, by a float, allowing the line from which the cable or pipe is suspended to pay out.

12 Claims, 7 Drawing Figures

BUOYANCY DEVICE AND METHOD

BACKGROUND OF THE INVENTION

When submarine cable or pipe is paid out from a barge or other vessel, particularly into deep water, it is desirable to support the weight of cable or pipe in the water by means of buoys or floats so that the entire length of cable or pipe does not present a tension load to the cable or pipe itself at its uppermost point. This is particularly important where the cable or pipe has discontinuities such as splices or joints that may be damaged by an extreme tension. A particular problem exists for the laying of submarine power cable, which is considerably heavier than communication cable. Experience has shown that splices in such cable, even when the diameter of the splices is only slightly larger than that of the cable itself, may develop cracks in the lead sheath under the armor or distortion of the insulation when high tension is encountered while taking bends at the cable laying capstan or bow sheave, even though these splices can take the same bends without difficulty at low tension. The tensile load encountered in submarine power cable being laid to depths exceeding 500 meters, and in recovering such cables for repair and re-laying may well be 20-30 metric tons or greater if the cable is not properly buoyed. Under such tension, particularly in the case of paper-insulated power cables, sudden longitudinal movement of the conductor may occur with respect to the rest of the cable structure. Such movements are, of course, very damaging, particularly at splices and terminations. In relatively shallow water, it has been known, especially in the laying of pipe, to reduce the load by buoying the pipe with hollow spheres or drums spaced at distances sufficiently large to permit the pipe to sink, dragging the buoys down with it. At a sufficient depth, however, the strongest of hollow buoys that are light enough in intrinsic weight to have a lifting effect, would be collapsed by external water pressure. Even were this not the case it would be undersirable to support more flexible articles such as electric cables at great depths and when the articles are substantially horizontal, with the same initial buoyancy as was appropriate for the steep angle of descent a cable usually assumes immediately adjacent to the laying vessel. For highly buoyant floats that are attached at widely spaced points to a flexible article would raise the article at these points and cause it to festoon in the lengths between supports.

It has been suggested to buoy an elongated article from a series of boats or buoys floating at the surface and equipped with winches. The disadvantages of this system are that, in deep water, it requires an excessive quantity of supporting line, and that the small boats will transmit the vertical movement of waves and swells to the suspended article along with horizontal effects created by wind. For very long installations surface floats might constitute an intolerable interruption of normal surface navigation. It would appear desirable, therefore, to utilize a buoy that neither remains on the surface nor retains its full buoyancy while sinking to the sea bottom with the article being laid. It might be thought that a buoy in the form of a bell, open at the bottom, would supply the desired means since the equalization of pressure inside the bell would prevent its collapse and the compression of air in the bell would reduce its buoyancy as it descended. This simple expedient would be useless in deep water, however, since the loss of buoyancy, with the air volume halving in the first 10 meters of descent, is too rapid.

The vertical contour taken by a cable or pipe underwater as it is being laid is determined by the water depth, the speed of the laying vessel, and the rate of descent. This latter can be controlled by the selection of buoyancy devices and their spacing. The bottom contour of the ground underwater is known. But the vessel speed is subject to weather conditions. It would be or great advantage to make provision in the buoyancy devices themselves for differences in descent rates as required for different laying conditions. Under certain circumstances it will also be desirable to permit divers or submarines to control the release of buoying devices from an article being laid, at some precise moment.

SUMMARY

I have invented a buoyancy device for at least partially supporting a submerged article and particularly an elongated article such as a cable or pipe being laid from a moving vessel, which comprises walls defining a submersible chamber, a substantial volume of gas enclosed in the chamber, and access means to the lower portion of the chamber for the water that surrounds the buoyancy device. This water will rise within the chamber and compress the gas as the depth of submergence of the buoyancy device increases. My buoyancy device also comprises a supply of flexible line which it holds in support. One end of the line is supportingly fastened to the submerged article and this end may be heavier than the trailing end of the line. Means within the chamber grip the line and pay it out, thereby changing the distance between the buoyancy device and the article. My buoyancy device advantageously comprises a cylindrical capstan which may advantageously be rotatably interlocked with propeller means projecting into the surrounding water and providing a braking effect. Perferably the length of the supply of flexible line is essentially shorter than the desired final distance between the buoynacy device and the article, and the trailing end of the line is not attached permanently to the buoyancy device so that, when the entire supply of line has passed around the capstan, the buoyancy device will be free to rise from the article, whence it may be recovered.

Advantageously my buoyancy device will comprise means, such as a float, that is responsive to the level of water within the chamber, for controlling the braking means. Advantageously also the braking means will comprise a friction brake and the float will be fastened to a lever arm that will release the brake and pay out line when the water level rises within the chamber. In some preferred embodiments my buoyancy device will comprise a pair of threaded posts passing through matching threaded holes in the float, and gear means, driven by the capstan, for rotating the posts to raise the float relative to the lever arm as line is paid out by the capstan. This has the effect of allowing more water into the chamber and reducing the lifting effect of the buoyancy device as the article being supported approaches bottom. In some embodiments my buoyancy device comprises a release line connecting the braking means and the article and sheave means paying out the release line. A centrifugal clutch supports the sheave means within the chamber in such a manner that the release line can pay out slowly without affecting the braking means but will release the brake upon a sudden application of tension.

I have invented a method of lowering an elongated article underwater which comprises the steps of paying the article from a supply of the same aboard a moving vessel and fastening a plurality of lines to spaced locations along the length of the article. The lines are individually connected to buoyancy devices and I submerge the article, along with the buoyancy device until the buoyancy devices have reached a depth where they are unaffected by wave motion or passing vessels. Thereafter I pay out the lines from the buoyancy devices so as to lower the elongated article at a speed substantially greater than any speed of lowering of the buoyancy devices, although my method may comprise a step of reducing the buoyancy of the buoyancy devices in the final stage of descent of the article.

DETAILED DESCRIPTION OF PREFERRED EMBODIMENT

Figure 1:
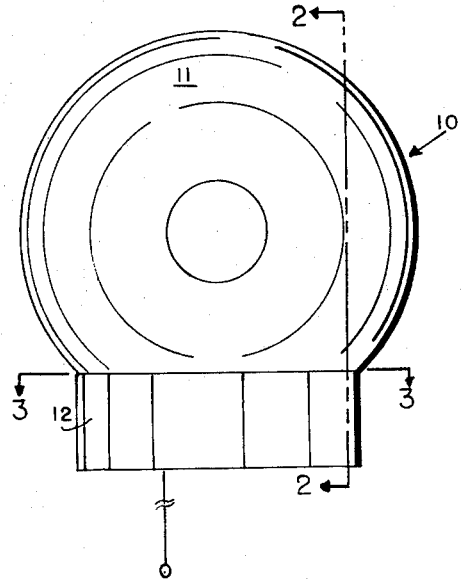
FIG. 1 shows a front view of my buoyancy device.

Referring first to FIG. 1 my buoyancy means or device, indicated generally by the numeral 10 is seen to have a generally spherical hollow bell 11 of glass-reinforced plastic and a lower cylindrical portion 12 in the form of a skirt, of steel. The wall 13 of the bell extends downwardly in a cylindrical shape at the area 14 to cover and grip a cylindrical wall 16 of the skirt 12. The walls 13 and 16 combine to define a chamber 17 for the entrapment of air or other gas 18 which may be compressed by the pressure of a mass of water 19 free to enter the chamber 17 through an open bottom 21 of the cylinder 12. Although the use of steel for the wall 16 as opposed to plastic for the wall 13, and the concentration of heavy elements, to be described, at the lower portion of the device 10 will usually suffice to prevent the device from turning bottom side up and permit escape of the gas 18, where conditions such as difficulty in launching or turbulent currents may be encountered, the opening 21 may be covered by a suitable bulkhead provided with a check valve for the entrance of water, or by a membrane designed to burst when sufficient depth is reached by the device 10 to remove the danger of its capsizing.

Figure 3:
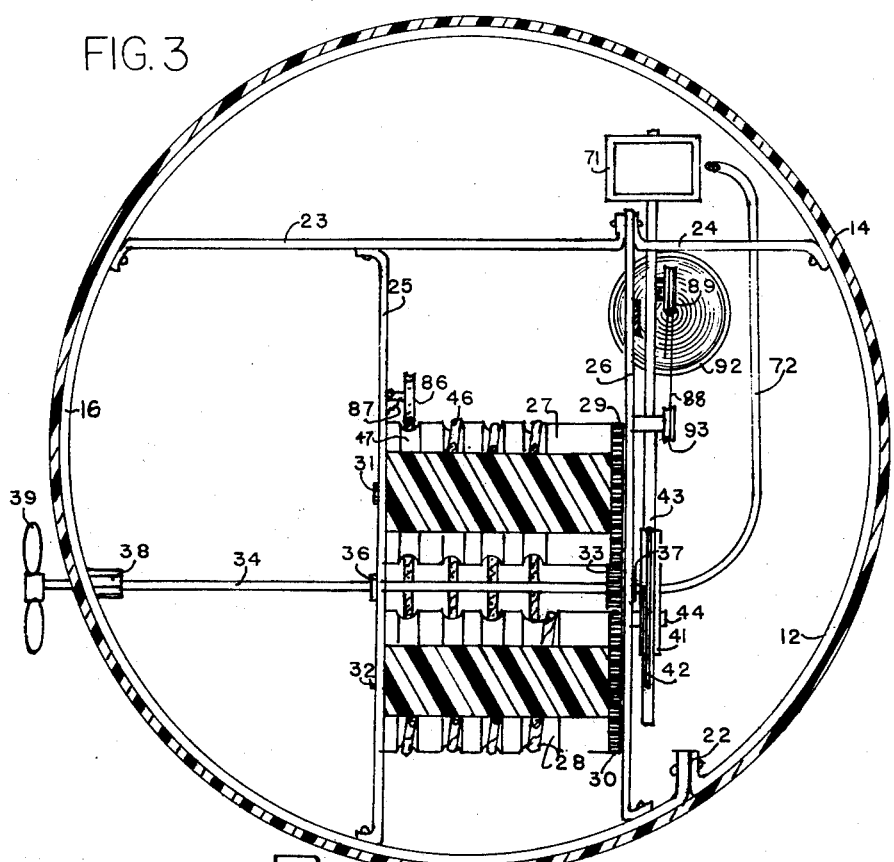
FIG. 3 shows an enlarged section through the line 3—3 of FIG. 1.

The cylindrical wall 16 is formed from a single strip, folded round and bolted at a flange 22 (FIG. 3). Internal steel chord beam members 23 and 24 are bolted to the wall 16 and to another beam 26 while a beam 25 is bolted between the wall 16 and the beam 23 to support the elements to be described. A pair of grooved capstans 27, 28, terminating in spur gears 29, 30 are mounted on respective shafts 31, 32 between the beams 26, 25. The gears 29, 30 intermesh with a braking pinion 33 keyed to a shaft 34. The shaft 34 passes through bearings 36, 37 on the beams 25, 26 respectively and through a bushing 38 on the wall 16. A propeller 39 is fixed to the shaft 34 at a point external to the walls of the device 10. The purpose of the propeller 39 is to brake the rotation of the capstans 27, 28 and it will be understood that, in lieu of a propeller, a paddle, turbine or hydraulic motor might be used to serve the same purpose within the scope of my invention. At the opposite end of the shaft 34 from the propeller 39 a brake drum 41 is fastened in contact with a brake band 42 which is connected at both ends to a lever arm 43 pivoting on a pin 44 projecting from the beam 26. A flexible rope line 46 pays into a grove 47 of the capstan 27 from a supply 48 coiled in a bin 49 from which it passes upwardly to a ring guide 51 and down through a hollow cylinder 52 in the center of the bin 49. The ring guide 51 is supported from the cylinder 52 by upright rods 53, 54. A floor 56 of the bin 49 has perforations 57—57 for the entrance of water so that the bin, of itself, will have no buoyancy. It will, however, be understood that other storage means for the line 46, such as a pail rigidly suspended below the capstans 27, 28 or a rotatable spool might be used in the practice of my invention with guides being provided, where necessary, for directing the line into a desired groove of the capstans.

Figure 2:
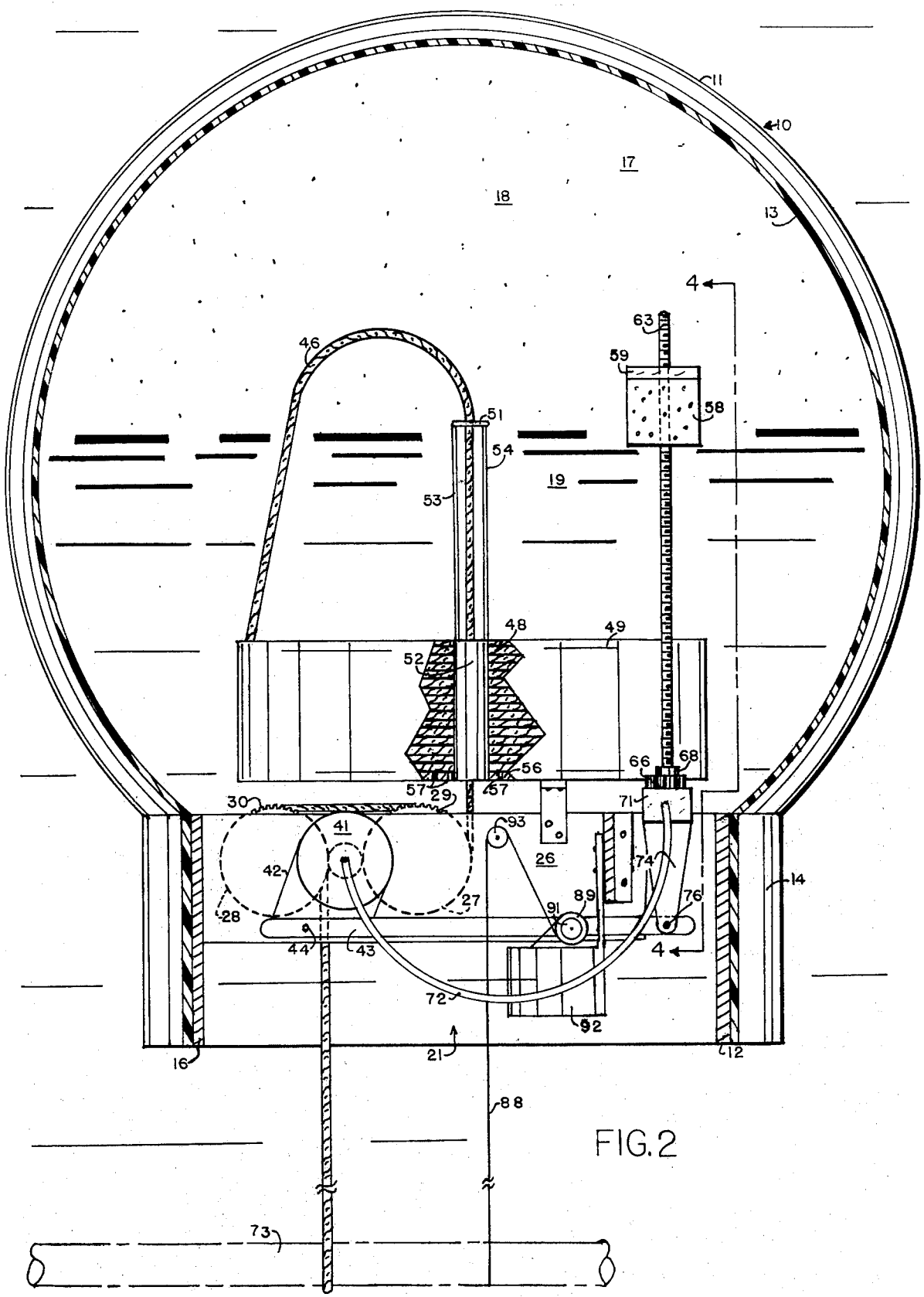
FIG. 2 shows an enlarged section through the line 2—2 of FIG. 1.
Figure 8:
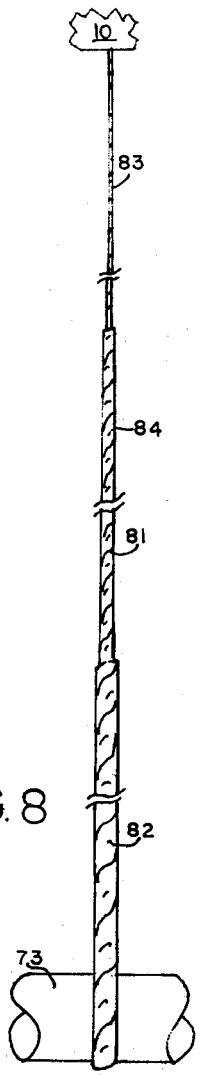
FIG. 8 shows an elevation of one embodiment of line used in my invention.
Figures 4, 6:
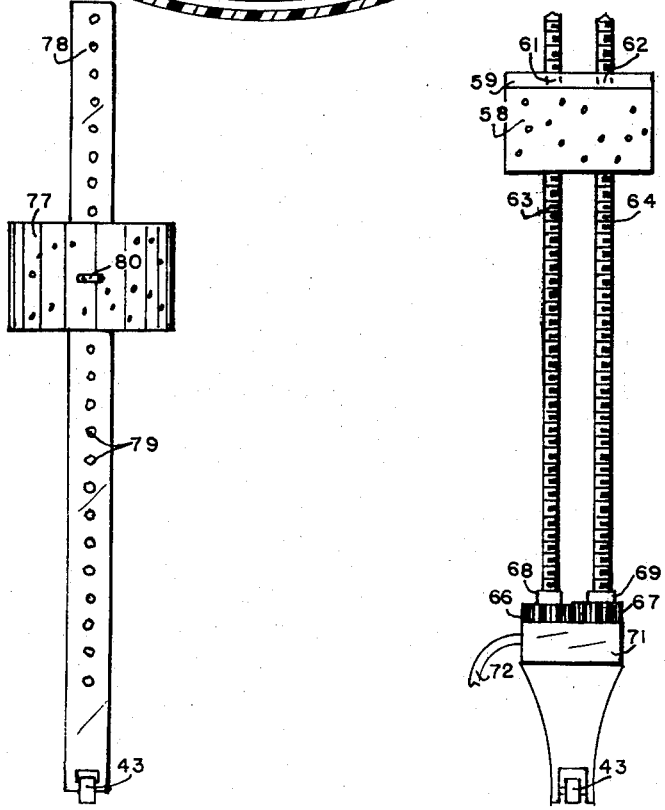
FIG. 4 shows a section through the line 4—4 of FIG. 2, exposing my float apparatus.
FIG. 6 shows embodiment of the float apparatus of FIG. 4.

At the right extremity of the lever arm 43, as seen in FIG. 2 there is hingedly mounted a float 58 of low density foam plastic bonded to a rigid dense plastic or metal plate 59 having two tapped bores 61, 62 through which are engaged two oppositely threaded plastic posts 63, 64 to the bottoms ofwhich plastic spurgears 66, 67 are locked by means of integral collars 68, 69 and appropriate set screws, not shown. The posts 63, 64 are rotatably mounted in bearings in the top of a gear reducer 71 through which one of the rods is driven slowly as the gear reducer is driven through a flexible shaft 72 extension of the shaft 34. The direction of rotation is such that the float 58 rises slowly on the posts 63, 64 as the capstans 27, 28 pay out the line 46. This line is fastened to a cable 73 or other article being laid, and as the line 46 is paid out the distance between the buoyancy device 10 and the cable 73 is increased. The gear reducer 71 is mounted onto the lever arm 43 through a support member 74 and locking pin 76 and the conbined weight of the elements 63, 64, 58, 59, 71, 74 is such that their moment around the pivot 44 is sufficient to put enough tension in the brake band 42 to prevent the capstans 27, 28 from turning and paying out any of the line 46. The device 10 will therefore sink along with the cable 73. As it sinks, however, the increased water pressure will cause water to enter the opening 21 and begin to compress the pocket of air 18. The water will also lift the float 58, reducing tension in the brake band 42, so that the line 46 will be paid out and allow the device 10 to rise until it reaches a point such that the water level within the chamber 17 no longer buoys the float 58 sufficiently to release line 46 and the device 10 will sink again until the process is repeated. Some restraint is required against paying out of the line 46 when the brake band 42 is relaxed to prevent the buoyant units 10 from repeatedly bobbing up in a series of jerking motions that would terminate in shocks to the cable 73. This restraint is provided by the propeller 39 which prevents too rapid rotation of the capstans. As the line 46 is paid out and the float 58 raised on the rods 63, 64 the device 10 will gradually reduce in buyoyancy due to the fact that increasing quantities of water will be required to enter the chamber 17 before the brake 42 is loosened. This reduced buoyancy will prevent the festooning of very flexible cables, as shall be explained, but, where festooning presents no problem because of a greater stiffness in the article being lowered, the short distance between buoy attachments, or a rapid permissable rate of descent, an alternative mounting of the float is illustrated in FIG. 6. Here a foam plastic float 77 is fixed to a perforated metal or plastic strip 78 which passes upwardly through a slot (not shown) in the center of the float, the strip being pivotally attached to the lever arm 43. By means of attachment perforations 79 in the strip 78, and a pin 80, the float can be fixed in a preselected position which will determine the effective buoyancy of the device 10 in operation. With the use of the float structure of FIG. 6 the flexible shaft 72 will be omitted along with the gear reducer 71, the float 77 having sufficient weight, in air, to hold the brake drum 41 against rotation. In lieu of sufficient weight of the float 77 additional weights or spring means may be added to activate the brake, within the scope of my invention. While the braking mechanism of the drawings has the advantages of simplicity and low cost, it will be understood that other braking mechanisms are known, mechanical, hydraulic, and magnetic that might be activated by the floats 58 or 77, within the scope of my invention. The line 46 must, of course, be capable of transmitting the lifting effect of the buoyancy device 10 to the article 73. This line is, however usually expendable and, moreover, it takes up significant space in the chamber 17 and adds weight counter to the desired buoyancy. Where the device 10 is designed to have a reducer buoyancy as the cable 73 decends, the high initial strength of the line 46 is no longer required. Refferring to FIG. 8 a line 81 has a maximum section in a leading length 82 that is fastened to the cable 73 and a much lighter trailing end 83, having a much smaller section, which is not paid from the capstan until the buoyancy device 10 has decended to a point where its buoyancy is a minimum. Intermediate weights of line are represented in the draing by the length 84. A further advantage of the tapered line 81 resides in the fact that, should the mechanism within the buoyancy device 10 fail to raise the float and reduce buoyancy, the smaller portion of the line would break, freeing the buoy and avoiding the formation of a loop in the cable. The line 46 is not positively tied to the buoying device 10 and is designed to be fully paid out before the cable 73 is deposited on the submarine bottom. When the end of the line has passed through the capstans 27, 28 there is no longer any connection to the cable and the device 10 is free to rise. To make sure that sufficient grip is maintained by the capstans on the line until the end of the line is reached, a roller 86 hingedly mounted to the beam 25 applies pressure against the line in one of the grooves of the capstan, being urged by a tension spring 87 (FIG. 3). A release line 88 is also tied between the cable 73 and the buoyancy device 10 for the purpose of releasing the brake by the hand of a diver or by means of a submarine with articulated grasping means. The purpose of tying the release line 88 to the cable is merely to aid a diver to locate the former. The line 88 takes a few turns around a sheave 89 which constitutes the outer rim of a centrifugal clutch 91. Such clutches are well known articles of commerce and will permit the sheave 89 to turn slowly but will engage and lock against rotation when rapid turning is attempted. A supply of the release line 88 is held in a rigidly suspended pail 92. From the sheave 89 the release line pays over a pulley 93 with the effect that a sharp tug on the release line 88 at any point below the device 10 will turn the lever arm 43 counterclockwise (as seen in FIG. 2) around the fulcrum 44 and release the brake band 42. This means will enable a diver to release any buoyancy devices the release mechanisms of which have otherwise malfunctioned, and to deposit the cable 73 or other article into a precise position such as a prepared trench.

It will be understood that my buoyancy device, hereinabove described, incorporates a "fail safe" feature in that, should the braking device of one of the buoyancy devices supporting a cable fail so that no line is paid out, the device will simply follow the cable down and soon lose so much buoyancy that it will not affect the way the cable comes to rest at the ocean bed.

OPERATION

Figure 7:
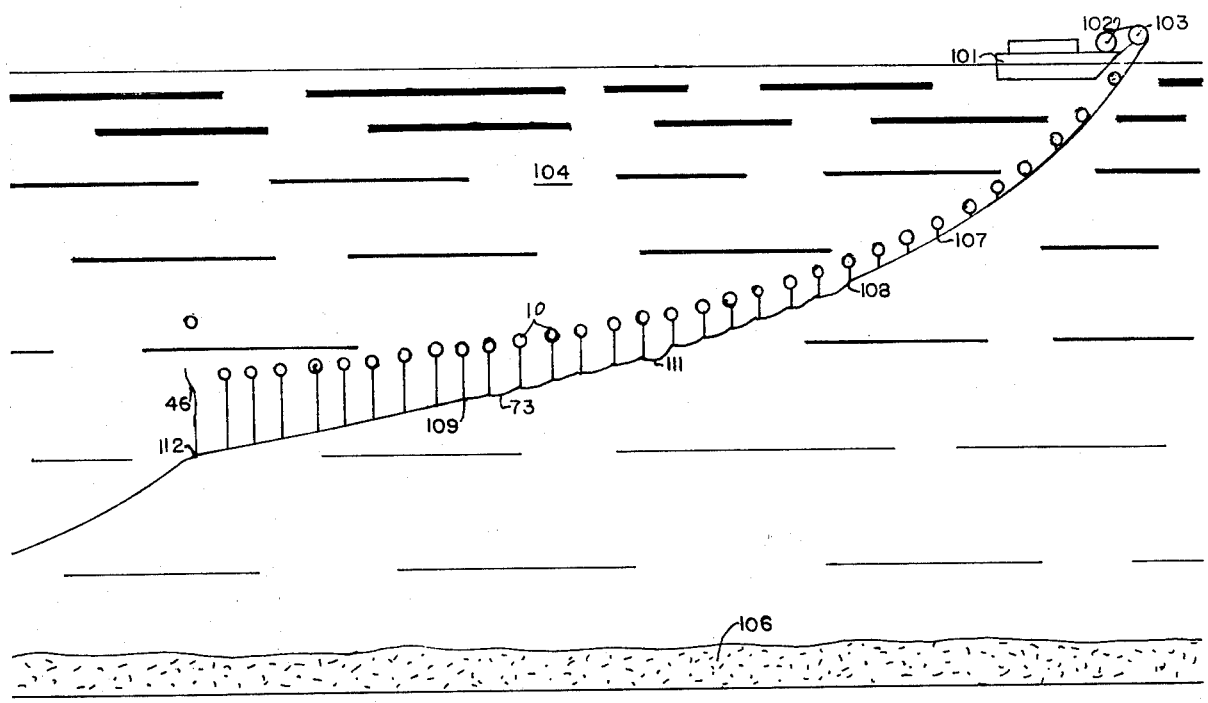
FIG. 7 shows an elevation of a vessel laying a cable in accodance with another embodiment of my invention.
Figure 5:
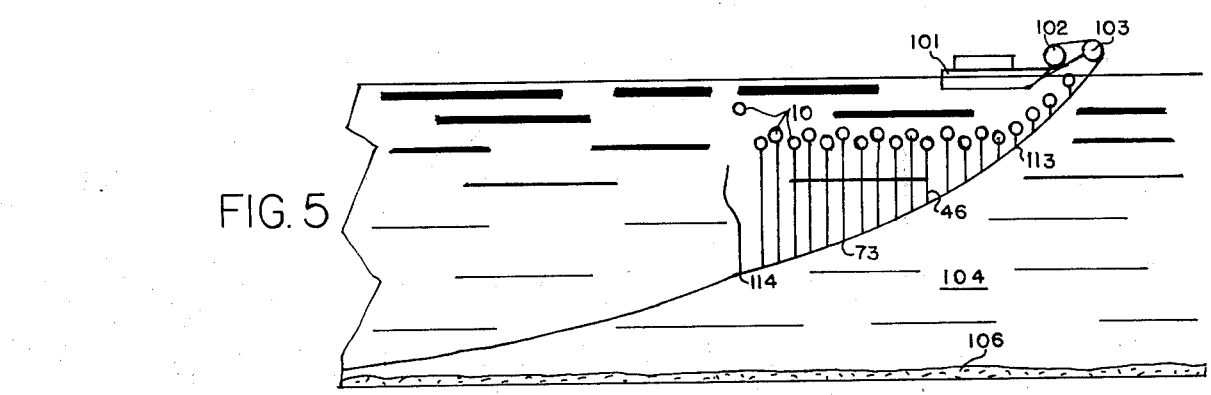
FIG. 5 shows an elevation of a vessel laying a cable in accordance with one embodiment of my invention.

The operation and method of my invention is best illustrated with the aid of FIGS. 5 and 7. A cable laying ship 101 carrying a cable capstan 102 and bow sheave 103 pays the cable 73 with the buoyancy devices 10 into a body of water 104 to deposit it on a bottom surface 106. Because of the adjustability of the floats 58 or 77 the depths at which the buoyancy devices will start to pay out line rather than sink at the same rate as the cable can be preselected and, if necessary, be varied from one buoyancy device to another with variations in laying conditions. In the case of the float 77 (FIG. 6) adjustment is made by inserting the pin 80 through the desired perforation 79, and in the case of the float 58 (FIG. 4) the flexible shaft 72 can be disengaged from the shaft 34 and rotated independently until the float assumes the desired position. In FIG. 7 the buoyancy devices 10 are equipped with the float mechanisms of FIG. 4 and the positions of the floats 58 on the rods 63, 64 have been initially established so that none of the line 46 will be paid out until the devices 10 have reached a desired depth. It will be understood that, while I have shown operations in which the article being submerged is paid from the bow of a ship, my invention has equal application where, as is most common, for example, in pipe laying, the article and buoys are launched from the stern of a barge. Referring again to FIG. 7 the lines 46 to the last three buoynacy devices being launched are of equal length because the water 19 (FIG. 2) has not yet reached a level to lift the float 58. The line at position indicated by the numeral 107 has, however, lengthened, and, in so doing has, through the turning of the capstans 27, 28 and the flexible shaft 72 raised, somewhat, the float 58 on the rods 63, 64. This process continues with the result that the devices 10 descent along with the cable 73 but at a slower rate since the length of the lines 46 are progressively increased as the cable nears the bottom. Because the position of the cable becomes more horizontal as the cable sinks, the devices 10 become spaced further apart in the water and, between the buoyancy devices at positions 108 and 109 festooning of the cable is seen to occur as evidenced by a maximum sag 111 at a point between these two positions. The magnitude of the sag decreases from this maximum point because of the greatly lessened buoyancy of the devices 10 which now hold increased quantities of water. At a position 112, prior to the point where the cable is deposited on the bottom, the length of the line 46 has been exhausted and, the line having passed completely around the capstan 27, 28 the device 10 is beginning to rise freely to the surface. In FIG. 5 the devices 10 have been spaced closely enough that, in combination with the stiffness characteristics of the cable 73, festooning does not present a problem. Here the float mechanism of FIG. 6 has been employed in the devices 10 with the result that the buoyancy devices, once the water has reached a predetermined level within them, have remained at a substantially fixed depth characterized by position 113. The depths of devices 10 at alternate positions are shown to vary somewhat because the devices sink until the water has risen enough to lift the float 77 and release line 46 whereafter they rise again until pressure of the gas 18 within the chamber 17 has forced out the water 19 against the reduced ambient pressure, and again applied the capstan brake. At position 114, at a preslected depth of the cable 73, the line 46 has become exhausted and has released its buoyancy device.

The foregoing description has been exemplary rather than definitive of my invention for which I desire an award of Letters Patent as defined in the appended claims.

I claim:

1. A buoyancy device for at least partially supporting a submerged article comprising:
   A. walls defining a submersible chamber,
   B. a substantial volume of gas enclosed in said chamber,
   C. access means to the lower portion of said chamber for water surrounding said buoyancy device, said water rising within said chamber and compressing said gas with increasing submergence of said buoyancy device,
   D. a supply of flexible line supported by said buoyancy device, one end of said line being supportingly fastened to said submerged article,
   E. means within said chamber gripping and paying out said line thereby changing the distance between said buoyancy device and said article,
   F. means braking said paying out means, and
   G. means controlling said braking means, said controlling means being responsive to the level of the water within said chamber.

2. The buoyancy device of claim 1 wherein said paying out means comprises a cylindrical capstan.

3. The buoyancy device of claim 2 wherein said braking means comprises, at least in part, propeller means rotatable in the water surrounding said buoyancy device and means rotatably interlocking said capstan and said propeller means.

4. The buoyancy device of claim 2 wherein the length of said supply of flexible line is essentially shorter than the desrired final distance between said buoyancy device and said article, said line being free from attachment to said buoyancy device after having passed its trailing end around said capstan.

5. The buoyancy device of claim 1 wherein said controlling means comprises a float.

6. The buoyancy device of claim 5 wherein said braking means comprises a friction brake for said capstan, and lever means controlling said friction brake, said float being carried on the surface of water in said chamber, said float being fastened to said lever means and lifting said lever means, thereby more freely paying out said line upon the rise of water in said chamber.

7. The buoyancy device of claim 6 comprising means raising said float relative to said lever means, said raising means being responsive to the paying out of said line.

8. The buoyancy device of claim 7 wherein said raising means comprises a pair of threaded posts, said posts passing through matching threaded holes in said float, and gear means rotating said posts, said gear means being driven by said capstan.

9. The buoyancy device of claim 7 wherein said line is heavier at its leading than at its trailing end.

10. The buoyancy device of claim 1 further comprising a release line connecting said braking means and said article, sheave means paying out said release line, a centrifugal clutch supporting said sheave means within said chamber, whereby said release line will pay out slowly without affecting said braking means but will release said braking means upon a sudden application of tension to said release line.

11. The method of lowering an elongated article underwater comprising the steps of:
    A. paying said article from a supply of the same aboard a vessel,
    B. fastening a plurality of lines to spaced locations along the length of said article, said lines being individually connected to a like plurality of buoyancy devices,
    C. submerging said article along with said buoyancy devices to a depth where said buoyancy devices are unaffected by wave motion or passing vessels,
    D. thereafter paying out said lines from said buoyancy devices so as to lower said article at a speed substantially greater than any speed of lowering of said buoyancy devices.

12. The method of claim 1 comprising the step of reducing the buoyancy of said buoyancy devices during the decent of said article.

* * * * *

UNITED STATES PATENT AND TRADEMARK OFFICE
CERTIFICATE OF CORRECTION

PATENT NO. : 4,048,686

DATED : Sept. 20, 1977

INVENTOR(S) : Sigmund Ege

It is certified that error appears in the above-identified patent and that said Letters Patent are hereby corrected as shown below:

Col. 5, line 27, after "shows" insert --another--.

Col. 8, line 47, for "claim 1" read --claim 11--.

Signed and Sealed this

Twenty-first Day of March 1978

[SEAL]

Attest:

RUTH C. MASON
Attesting Officer

LUTRELLE F. PARKER
Acting Commissioner of Patents and Trademarks